United States Patent [11] 3,621,023

[72] Inventor Dhurairajan Padmanabhan
Highland Park, N.J.
[21] Appl. No. 732,045
[22] Filed May 27, 1968
[45] Patented Nov. 16, 1971
[73] Assignee American Cyanamid Company
Stamford, Conn.

[54] 1,3,2-OXAZABORINIDES AND METHOD FOR PREPARING THE SAME
2 Claims, No Drawings
[52] U.S. Cl. .................................................... 260/256.4
E, 8/162 R, 8/162 B, 106/204, 252/301.2 R,
260/41 C, 260/41.5 R, 260/304, 260/307 F,
260/309.2, 260/310 R, 260/310 D, 260/326.1,
260/462 R
[51] Int. Cl. .......................................................... C07d 51/46
[50] Field of Search .......................................... 260/256.4 E

[56] References Cited
UNITED STATES PATENTS
2,886,575   5/1959   Conklin et al. ................   260/243

*Primary Examiner*—Alex Mazel
*Assistant Examiner*—R. V. Rush
*Attorney*—John L. Sullivan ABSTRACT: Condensed difluoro or diacetoxy 1,3,2-oxazaborinides are prepared by treating (a) a condensation product of a naphthostyril with an active ketomethylene compound, such as barbituric acid or its, N,N-dialkyl derivatives, an indandione, an oxindole or a pyrazolone, (b) a condensation product of an o-hydroxybenzaldehyde with an aromatic amine, or (c) an ortho-(beny-azol-2yl)-naphthol or phenol, the azole being oxazole, thiazole or imidazole, ortho-(benzazol-2yl)-naphthol either (1) boron trifluoride dissolved in ether, or (2) orthoboric acid, benzeneboronic acid or esters thereof, in acetic acid in the presence of acetic anhydride, at reflux. The difluoro and diacetoxy-1,3,2-oxazaborinides are characterized by affinity for polyesters when applied by disperse dyeing methods and fluoresce on the fiber. Similar effects are obtained on nylon and acetate and to some extent on modified polyacrylonitrile.

1,3,2-OXAZABORINIDES AND METHOD FOR PREPARING THE SAME

This invention relates to new heterocyclic compounds containing boron and to certain nonboron intermediates which are outstanding for use as fluorescent disperse dyes. It also relates to a novel method for the preparation of certain of the boron-containing compounds.

Especially this invention relates to 1,3,2-oxazaborinide compounds represented by the formula:

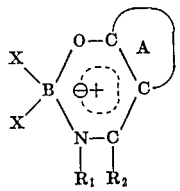

wherein A is the residue of an active ketomethylene compound from which the 1-oxo group is derived, X is halogen or acyloxy; $R_1$ and $R_2$ are selected from the group consisting of H, lower alkyl and aryl, individually, or which together with the —N—C— group to which they are attached form an azole. These compounds are characterized by their ability to dye synthetic fibers, especially polyester, nylon and acetate, giving mainly yellow to orange to red hues of good fastness to light. The dyed fibers show bright fluorescence in ultraviolet light of yellow to orange to red.

In practicing this invention, a condensate of the formula represented in a keto and enol form,

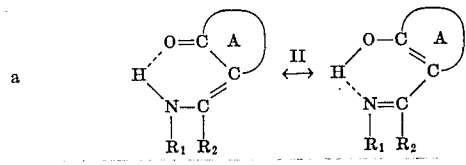

wherein A, $R_1$, and $R_2$ are defined as above, is reacted with either:

1. a boron trihalide, such as boron trifluoride or trichloride, in an inert solvent to give a 1,3,2-oxazaborinide represented by the formula I above, X being fluoro or chloro. The boron trihalide is used in excess. Being gaseous at ordinary temperature it is usually dissolved in an inert organic solvent carrier for addition, such as diethyl ether. It is added to the condensate a-b in a solvent inert to both, such as acetic acid, xylene, chloroform, or nitrobenzene. The reaction is carried out at reflux. The 1,3,2-oxazaborinide is isolated by pouring the reaction mixture on to crushed ice. The separated product is filtered, washed with water and recrystallized from solvents such as chloroform or dimethylformamide, xylene or benzene, 2. orthoboric acid, $B(OH)_3$, or its derivative benzeneboronic acid, $Ph\, B(OH)_2$, in acetic acid in the presence of acetic anhydride to give a diacetoxy 1,3,2-oxazaborinide (X = acetoxy). This reaction is also carried out at reflux. The product is insoluble in the cold reaction mixture. Other boronic acids such as benzyl or alkylboronic acids are equally operable. The reaction to give the diacetoxy analogue is unexpected and is an embodiment of this invention, or 3. the difluoro 2,3,2-oxazaborinide prepared above can serve as a starting material instead of II above for the preparation of the diacetoxy 1,3,2-oxazaborinide.

As starting materials of the types II a and b there may be used condensates formed by reaction of an o-hydroxy aromatic aldehyde with an aromatic amine, exemplified by example 15. This gives an azomethine compound in which $R_1$ and $R_2$ are H, lower alkyl or aryl: e.g.,

| Aldehyde | Amine |
|---|---|
| o-hydroxybenzaldehyde | m- or p-anisidine<br>m- or p-phenetidine |
| 2-hydroxy-1-naphthaldehyde | |
| 1-hydroxy-2-naphthaldehyde | |
| 3-hydroxy-2-naphthaldehyde | |

These and their ring-substituted derivatives are known solids. Their preparation is given in the art.

Another class of starting material is type II a and b above, where $R_1$ and $R_2$ form an azole.

One subgeneric type of this class is a 2-(o-hydroxy-phenyl)benz-azole such as:

2-(o-hydroxyphenyl)benzoxazole
2-(o-hydroxyphenyl)benzothiazole
2-(o-hydroxyphenyl)benzimidazole These compounds and their ring-substituted derivatives are known in the art as, for example, U.S. Pat. No. 2,995,540 and 3,049,509. Their use is described in example 12 and 13.

Further starting materials of type II, where $R_1$ and $R_2$ together form an azole is a perinaphthazole:

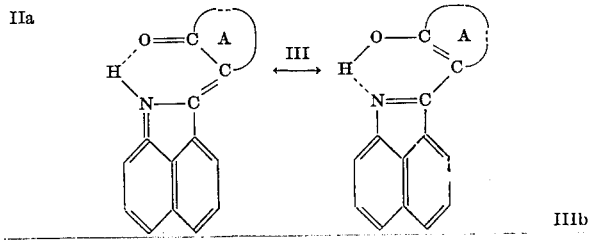

where A is defined as above. Absence of free NH, OH or

peaks in the infrared spectrum is evidence for a chelated structure. Perinaphthazole is also called naphthostyril, 1,2-dihydrobenz[cd]indole or benz[cd]indoline.

These condensation products are readily prepared starting with a known 2-methylthio-1,2-dihydrobenz[cd]indole salt (IV) such as the hydroiodide. G. E. Ficken and J. D. Kendall, J. Chem. Soc., p. 1,539 (1960). IV is condensed with an active ketomethylene compound in alcohol or acetic acid, in the presence of sodium acetate, at reflux for several hours, The product separates, especially on cooling. The active ketomethylene compound may be a pyrazolone (ex. 1 thru 5), a barbituric acid (ex. 6 and 7) an indandione (ex. 8) or a 2-hydroxyindole (ex. 9, 10). Examples of specific active ketomethylene compounds in addition to those shown in the examples are:

1-(3'-acetylaminophenyl)-3-methyl-2-pyrazolin-5-one
3-anilino-1-phenyl-2-pyrazolin-5-one
3-methyl-1-(2', 3 or 4'-chlorophenyl)-2-pyrazolin-5-one
3-methyl-1-(2', 5'-dichlorophenyl)-2-pyrazoline-5-one
3-methyl-1-(4'-nitrophenyl)-2-pyrazolin-5-one
3-methyl-2-pyrazolin-5-one
3-methyl-1-(2,4,6-trichlorophenyl)-2-pyrazolin-5-one
3-methyl-1-phenyl-2-pyrazolin-5-one
3-methyl-1-phenyl-2-pyrazolin-5-one
3-phenylamino-1-phenyl-2-pyrazolin-5-one Direct alkylation or acetylation of the azole nitrogen of the condensation product is difficult. These condensation products are disperse dyes giving orange to brown hues on polyesters with fair to good lightfastness and color value.

Active ketomethylene compounds for practice of this invention are the barbituric acids which are condensed with IV to give products which may be chelated with boron as described above. These include barbituric acid, its N,N-dialkyl and N,N-cyanoalkyl derivatives as listed in the examples and its N-phenyl derivative. These are condensed in the same way as pyrazolones. Alkylation and cyanoalkylation may be done on the free barbituric acid condensate. The product corresponding to II above may have one, two, or three of its nitrogens so substituted. The unchelated condensates are disperse dyes which give bright green-yellow to yellow hues on polyester, nylon, acetate, and polyacrylonitrile. They fluoresce bright green-yellow to yellow shades under ultraviolet light. Lightfastness is almost as good as the boron chelates thereof.

Another active ketomethylene compound for the practice of this invention is indandione shown in example 8. The advantage of this condensate is that it can be halogenated (brominated or chlorinated) or nitrated, to give mono substituents in the six position and disubstituents in the 6,8-positions of the naphthostyril moiety. (See Ring-Index 2935 for numbering.) The indandione may be substituted such as 5,6-dibromo or dichloror-1,3-indandione. These are disperse dyes giving yellow to orange hues on polyester, nylon and acetate, and fluoresce on the fiber.

Chelateable condensates may be prepared by condensing IV with glycine or its N-benzyl, N-benzoyl or p-aminobenzoyl derivatives. These are acetylated and ring closed in acetic acid in the presence of acetic anhydride to form azalactones of the type shown in example 11.

Other chelateable condensates may be formed by condensing IV with active ketomethylene compounds such as 5,5-dimethyl-1,3-cyclohexanedione like those disclosed in column 3 of U.S. Pat. No. 2,822,359, indoxyl, 5-bromo or 5-chloroindoxyl, 2,5-dibromo or 2,5-dichloroindoxyl, 1,8-perinaphth-1,3-indandione, 4-methyl-6,7-benzo-1-thia-5-aza-4,6-cycloheptadiene-2-one, 5-phenyl-6,7-benzo-1-thia-5-aza-4,6-cycloheptadiene-2-one and the like.

All of the above condensates are chelateable with boron as described. These dihalo and diacryloxy-1,3,2-oxazaborinides have strong affinity for polyester when applied by the method of example 17 and fluoresce under ultraviolet light. On the fiber they fluorescence yellow to orange to red hues. Many of them are equally intense on nylon and acetate and some on modified polyacrylonitrile. To some extent they dye modified polypropylene but do not fluoresce on this fiber.

A preferred group are the 1,3,2-oxazaborinides derived from naphthostryril and barbituric acid, including its N,N-dialkyl derivatives of one to four carbon atoms, N,N-dicyanoethyl and the corresponding thiobarbituric acids. These 1,3,2-oxazaborinides show equally strong affinity and fluorescence on polyester, nylon, acetate and modified polyacrylonitrile having nitrogenous sites such as Creslan Acrylic fiber, when dyed at the boil.

These dyes seem to have slightly more affinity for polypropylene modified by amides rather than amines. They are not suitable for unmodified polypropylene.

The 1,3,2-oxazaborinides have been represented by formula I above but could also be represented in four other ways as represented by the following formulas:

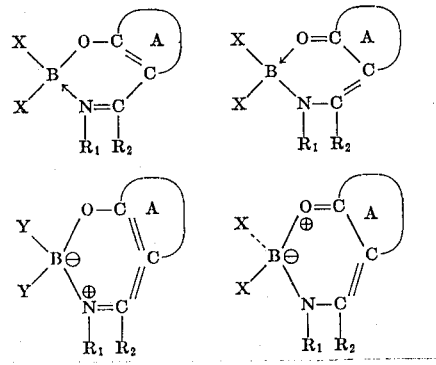

A preferred embodiment of this invention is the diacetoxy 1,3,2-oxazaborinide (X = acetoxy) which has been found to be especially stable. This forms in acetic acid in the presence of acetic anhydride. Even when benzeneboronic acid, PhB(OH)$_2$, is used and the expected product is a monohydroxy monophenyl 1,3,2-oxazaborinide, the phenyl group is not found attached to the boron in the final product. It is split off and the diacetoxy borinide formed instead. The diacetoxy 1,3,2-oxazaborinides are distinct from diphenyl 1,3,2-oxazaborinides of the art because they have greater fluorescence.

Many of the 1,3,2-oxazaborinides of this invention are useful for coloring varnishes, resins and plastics, such as poly(methyl methacrylate), nitrocellulose, polyethylene and polystyrene. They fluoresce in these substrates. They are most useful where intense heat and light are not a factor. Their fluorescence on synthetic fibers as mentioned above is also of commercial interest and their stability to light on the fiber is good. All of the fibers mentioned may be dyed by the procedure of example 17.

The following examples illustrate this invention

EXAMPLE 1

4-Benz[cd]indol-2(1H)-ylidene-3-methyl-1-phenyl-2-pyrazolin-5-one

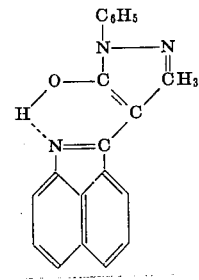

A mixture of 3.27 g. 2-methylthio-1,2-dihydrobenz[cd]indole hydriodide IV, hereinafter referred to IV, 1.8 3-methyl-1-phenyl-2-pyrazolin-5-one, and 0.85 g. anhydrous sodium acetate, in 100 ml. ethanol are heated at reflux with stirring for 5 hours. After cooling, the product is filtered, washed with petroleum ether, dried and recrystallized from mixed ethylene dichloride-ethanol. Yield is 2.0 g. product, m. 231–3° C.

EXAMPLE 2

Difluoro-1-methyl-3-phenyl-3H,8H-benz[3,4]indolo[1,2-c]-pyrazolo-[4,3-e]-1,3,2-oxazaborinide

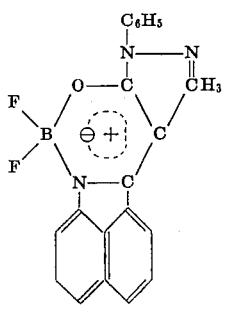

To 2 g. of the product of example 1 in 100 ml. chloroform heated at reflux, is added 15 ml. boron trifluoride etherate containing 47 percent BF$_3$ in ethyl ether. After 1 hour at reflux, the mixture is diluted with ethanol and poured on to crushed ice. The product is filtered and dried to give 2.1 g. orange crystals melting 270–72° C., soluble in chloroform and dimethyl formamide. Recrystallized from dimethyl formamide it melts at 272–74° C.

It dyes polyester a yellow shade of good strength having a Fade-Ometer lightfastness rating of 4–5. Lighter shades are obtained on nylon, acetate and polypropylene fibers. All fluoresce orange under UV light with the exception of polypropylene.

In general purpose polystyrene in 0.04 percent concentration, it develops a bright transparent fluorescent orange which shows no significant change after 70 hours exposure in a Fade-Ometer. However, 5 minutes of heat at 450° F. produces a slight change of shade and strength.

EXAMPLE 3

Dihydroxy-1-methyl-3-phenyl-3H, 8H-benz[3,4]-indolo[1,2-c]-pyrazolo[4,3-e]-1,3,2-oxazaborinide diacetate

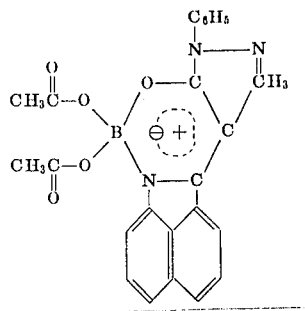

To 2.0 g. product of example 2 in 30 ml. acetic acid is added 30 ml. acetic anhydride. The whole is heated at reflux until acetoxylation is complete, cooled, the product isolated by filtration and dried. Yield 2.25 g., orange crystals m. 278–80° C., soluble in chloroform. Recrystallized from acetic acid it melts at 280–82° C.

This compound dyes polyester, nylon, acetate and polypropylene a burnt orange of good tinctorial strength which fluoresces orange under UV light and has lightfastness ratings in the range of 4–5. Dyed on polyester in 0.1 percent shade it is unchanged for 40 hours under Xenon arc lamp.

Instead of the difluoro product of example 2, the starting material may be the corresponding dichloro 1,3,2-oxazaborinide. The dichloro product is prepared by the procedure of example 2 except that 2 g. boron trichloride pyridine complex is used instead of the boron trifluoride etherate.

EXAMPLE 4

When 1.0 g. of the compound of example 1 is heated at reflux with an excess of orthoboric acid B(OH)$_3$, 1.0 g. in 35 ml. acetic acid, with 10 ml. acetic anhydride for 7 hours, a quantitative yield of the diacetoxy compound, m.p. 280–82° C. is obtained. Its dyeing properties are the same as described in example 3.

When 2.0 g. of the compound of example 1 is heated at reflux with 1.0 g. phenylboronic acid, an excess, in 75 ml. acetic acid in the presence of 20 ml. acetic anhydride, for 2½ hours, and cooled, a quantitative yield of the compound of example 3 is obtained.

When equivalent amounts of the compound of example 2 and phenylboronic acid are used, the same compound is obtained.

EXAMPLE 5

If in example 1, instead of 3-methyl-1-phenyl-2-pyrazolin-5-one, other 2-pyrazolin-5-ones are used in equimolecular amount, and the products reacted with boron trifluoride after the fashion of example 2, corresponding difluoroborinide fluorescent dyes are obtained as follows.

Color on Polyester and
Fluorescence of Difluoro-

| 2-Pyrazolin-5-one | borinide Derivative |
|---|---|
| 1. 3-methyl-1-(4'-chlorophenyl) | orange (fluoresces orange) |
| 2. 1,3-diphenyl | yellow (fluoresces orange) |
| 3. 3-methyl-1-(4'nitrophenyl) | orange (bri. orange fluor.) |
| 4. 3-carboethoxy-1-phenyl | orange (bri. orange fluor.) |

Dye No. 2 colors poly(methyl methacrylate), ureaformaldehydealkanol and ureamelamine resins yellow which fluoresce yellow under ultraviolet light.

The unchelated precursor of dye No. 4, dyes polyester and acetate reds of good tinctorial strength and lightfastness ratings of 5–6, 5–6, and 6, respectively. The unchelated dye is nonfluorescent. However, when chelated with boron trifluoride, its hue becomes orange and it shows an intense light orange fluorescence on polyester and acetate and to some extent on nylon in UV light.

The diacetoxy 1,3,2oxazaborinide anologue of No. 2, dyes polyester, nylon, acetate and modified polypropylene a burnt orange hue which fluoresces a light red-orange on acetate under UV light and to some extent polyester and nylon but not on polypropylene.

EXAMPLE 6

Difluoro- and Diacetoxy-1,2,3,4-tetrahydro-1,3-dioxo-8H benz[3,4][1,2-c]pyrimido[5,4-e]-1,3,2-oxazaborinide

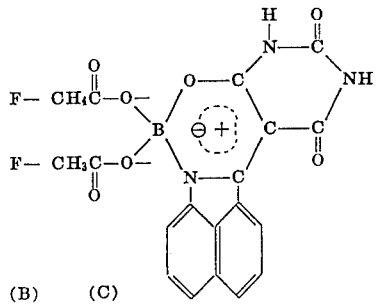

(B) (C)

A. 5-benz[cd]indol-2(1H)-y!idene-barbituric acid

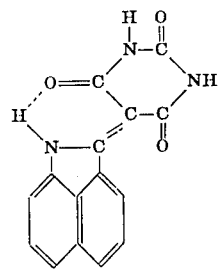

5,4

To 4.905 g. IV and 1.7 g. sodium acetate in 135 ml. acetic acid at reflux, is added 1.92 g. barbituric acid. Refluxing is continued. When the reaction is complete, the whole is cooled, filtered and the product leached with hot ethanol and washed with acetone, hot ethanol and water. After further washing with hot acetone and warm dimethylformamide the product is dried to give 2.S g.,m. 355–7° C.

The dye is a bright yellow on polyester, nylon, acetate and polacrylonitrile. Lightfastness rating is respectively 3, 3, 5–6, and 4–5. Under ultraviolet light, all fibers have a bright light yellow fluorescence. The sodium salt of the dye has similar dyeing properties.

B. The difluoro borinide

Three grams of product A in 30 ml. boron trifluoride etherate (of example 2) are heated at reflux for 2 hours, cooled and poured into crushed ice. The product is washed with water and dried. Yield is 2.95 g. m. 410–15° C. of the difluoro borinide compound.

This compound dyes nylon yellow having a lightfastness rating of 4–5. It fluoresces a bright pale yellow under ultraviolet light. A lower tinctorial effect and fluorescence is present on the other synthetic fibers.

C. The diacetoxy borinide

To a refluxing mixture of product A (2.7g.) in 100 ml. acetic acid is added 1.6 g. orthoboric acid and 20 ml. acetic anhydride. When the reaction is complete, the whole is cooled and filtered. The product is washed with acetic acid and petroleum ether and dried. Yield 2.75 g., m. 390° C. dec.

The compound dyes nylon, acetate and polyester strong bright green-yellow shades of good fastness to light, rating 4–5, 5–6, and 5, respectively. Under ultraviolet light, the dyed fibers display brilliant green-yellow fluorescence.

EXAMPLE 7

A. When the product of example 6–A, is dimethylated to give methyl groups on both nitrogens of the barbituric acid moiety, a product m. 284–86° C. is obtained. It dyes polyester, nylon and acetate bright yellow shades having a lightfastness rating of 3, 4, and 5 respectively. It shows a bright yellow fluorescence on the fibers.

B. The difluoro borinide of the N,N-dimethyl derivative prepared as in example 6–B, m. 335–40° C., is a similar yellow with especially strong fluorescence on polyester and acetate. Lightfastness is improved respectively to 5–6, 3–4, and 6. This dye can also be dyed on polyester by the Thermosol method.

This product colors poly(methyl methacrylate) resin yellow which under UV light gives a bright light yellow fluorescence.

C. The diacetoxy borinide derivative prepared as in example 6–C, m. 273–5° C., is also a yellow of strong tinctorial value on polyester, nylon and acetate and fair on polypropylene. Lightfastness ratings are 3–4, 3–4, 5–6, and 4, respectively. On these fibers, it fluoresces yellow. It can be dyed on polyester by the Thermosol method.

If N,N-diethyl barbituric acid is used in A, a product m. 284–86° C. is obtained. When converted to the difluoro or diacetoxy boronide, a compound with similar dyeing properties is obtained.

EXAMPLE 8

Diacetoxy- and Difluoro-14-oxo-8H-benz[3,4]indolo[1,2-c]-indeno[2,1-e]-1,3,2-oxazaborinide

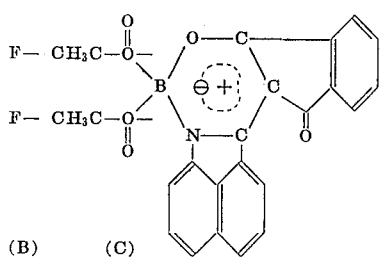

(B)       (C)

A. 2-(1,2,-Dihydro benz[cd]indol-2-ylidene)-1,3-indandione.

A mixture of 15.05 IV and 3.8 g. sodium acetate is dissolved in 400 ml. hot ethanol. To the solution is added 6.75 g. indan-1,3-dione and heating continued at reflux for 6 hours. The product is filtered hot, washed, with alcohol and dried, m. 287–90° c. Crystallized from dimethyl formamide, m. 289–91° C.

B. Difluoro Borinide

A 5.0 g. sample of A was heated at reflux with 100 ml. boron trifluoride etherate for 24 hours, cooled and poured into crushed ice. It was filtered and dried, giving 9.5 g. product. Recrystallized from dimethyl formamide, it melted 304–7° C.

It dyes polyester deep red orange of good color value having better fastness to light than the unchelated (5 to 2–3 respectively). Lighter more yellowish orange shades are obtained on nylon, acetate and modified polyacrylonitrile. However, the latter show a bright pale orange fluorescence under UV light.

When incorporated in thermoplastics such as general purpose polystyrene or poly(methyl methacrylate) the color develops well to a bright transparent orange of good lightfastness. Its properties in the presence of titanium dioxide are good. It is useful where heat stability is not a factor.

C. Diacetoxy Borinide

A mixture of 5.95 g. dye A above, 1.3 g. orthoboric acid, 250 ml. acetic acid and 50 ml. acetic anhydride is heated at reflux for 24 hours, cooled and the product filtered to give 5.65 g., m. 297–8° C.

It dyes polyester acetate and nylon an orange of good color value with a lightfastness of 3 on all fibers. They show an orange fluorescence. It dyes polypropylene an orange which does not fluoresce.

Halogenated and nitrated derivatives of product A likewise are capable of chelation with boron. Examples of these derivatives are the following.

Derivative of A 1. monobromo, m. 315–20°
2. dibromo, m. 298–300°
3. dichloro, m. 307–10°
4. mononitro, m. 360–5°

These dye polyester orange which fluorescence under ultraviolet light, The mononitro compound has a bright yellow fluorescence under UV light.

EXAMPLE 9

Diacetoxy-8H, 10H Benzo[3,4]diindol o[1,2-c:3',2'-e]-1,3,2-oxazaborinide

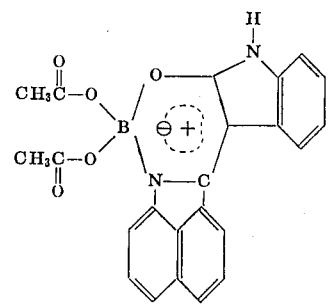

To a refluxing mixture of 1.5 g. of the unchelated dye prepared using the procedure of example 6–A, with 3-benz[cd]indol-2-yl-indol-2-ol instead of barbituric acid in 75 ml. acetic acid, is added 0.7 g. boric acid and 15 ml. acetic anhydride. After 24 hours at reflux, the whole is cooled to room temperature, filtered and dried, to give 1.8 g. 310° C. dec.

It dyes polyester, acetate and nylon red shades which fluoresce. The fluorescence on polyester is a strong red under ultraviolet light.

EXAMPLE 10

The difluoro borinide corresponding to example 9.

A mixture of 2.0 g. 3-benz[cd]indol-2-yl-indol-2-ol and 30 ml. boron trifluoride etherate having 47 percent $BF_3$, is heated at reflux for 1½ hours, cooled by ice bath and mixed with 25 ml. ethanol. The whole is poured into crushed ice and stirred. The product is filtered washed with ethanol and dried to give 2.1 g., m. 370–75° C.

The product dyes polyester, acetate and nylon, strong red shades. Polyacrylonitrile is dyed a medium red shade. All give a bright coral fluorescence under UV light. Lightfastness is 3–4 on polyacrylonitrile, nylon and acetate, 3 on polyester and 2 on polypropylene.

It colors poly(methyl methacrylate)resin red which fluoresces orange under UV light.

EXAMPLE 11

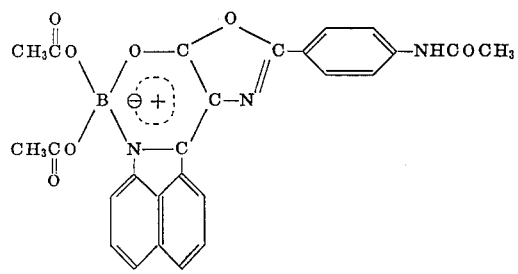

A. To a mixture of 6.54 g. IV and 1.65 g. sodium acetate in 50 ml. hot acetic acid is added 3.9 g. N-(p-aminobenzoyl) glycine dissolved in a mixture of 50 ml. acetic anhydride acid and 25 ml. acetic acid. The whole is heated at reflux for 2 hours, cooled and drowned in ice. The product is filtered, washed with alcohol and dried to give 3.8 g. product. Recrystallized from dimethylformamide, it melts 322–5° C. It dyes polyester, nylon, acetate and modified polyacrylonitrile, a bright red hue which under ultraviolet light has a bright red-orange fluorescence.

Without the p-acetylamino group the unchelated dye is a bright red-orange or coral on polyester, fluorescing a very bright orange under UV light. A methyl group instead of phenyl produces a blue-red on polyester which also fluoresces orange.

EXAMPLE 12

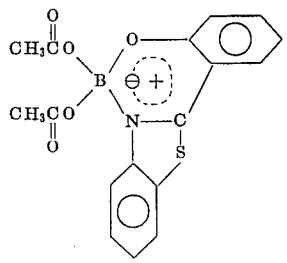

To 5 g. 2-(o-hydroxyphenyl)-benzothiazole in 50 ml. acetic acid, is added 1.6 g. boric acid and 25 ml. acetic anhydride. The whole is heated at reflux for 3 hours, cooled, filtered and the product dried. The product is washed with ether and dried to give 5.3 g., m, 252–53° C.

This compound has strong affinity for polyester. Although colorless in daylight, it fluoresces a strong light yellow under ultraviolet light. (It has no affinity for polyacrylonitrile or wool.) It has some affinity for acetate and nylon. It fluoresces light yellow in these fibers.

EXAMPLE 13

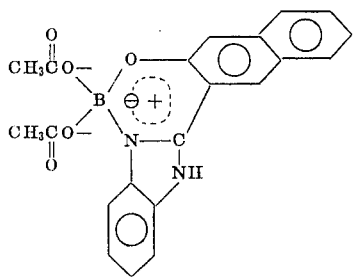

To 1.0 g. 3-(benzimidazol-2-yl)-2-naphthol discovered by J. L. Rodgers, in 50 ml. acetic acid and 10 ml. acetic anhydride is added 0.28 g. boric acid. The whole is heated at reflux for 2½ hours, filtered and the product dried; 0.65 g., m. 288° C.

Although colorless on synthetic fibers, it has affinity and fluoresces on them. It has strong affinity for polyester, fluorescing medium coral shades. On nylon it fluoresces a light orange. For acetate, it has slightly less affinity and fluorescence.

If in the above procedure the 3-(benzoxazole-2-yl)-2-naphthol is used instead of the imidazole a product of similar substantivity and fluorescence is obtained.

EXAMPLE 14

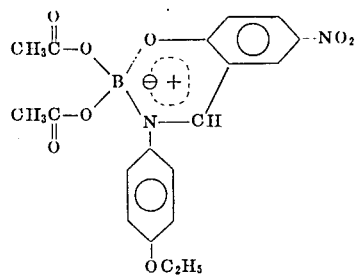

To 2 g. N-(2-hydroxy-5-nitrobenzylidene)-p-phenetidine and 1 g. phenylboric acid in 30 ml. acetic acid at reflux, is added 5 ml. acetic anhydride. After heating at reflux for 1 hour, the whole is cooled and filtered to give 1.0 g. product, m. 240–1° C.

This compound gives light yellow shades on polyester, nylon, acetate and modified polypropylene. However, it is of special interest because of its intense light yellow fluorescence on polyester. The fluorescence is also indicative of the strong affinity this compound has for that fiber.

EXAMPLE 15

The difluoro analogue of the product of example 14 is prepared as follows:

To a refluxing mixture of 1.0 g. N-(2-hydroxy-5-nitrobenzylidine)-p-phenetidine in 50 ml. refluxing xylene, is added 1 ml. boron trifluoride etherate (of example 2). An immediate precipitate forms which dissolves on further refluxing. After 3 hours at reflux the whole is cooled, filtered and the product dried to give 1.05 g., m. 210–11° C.

The product dyes polyester, nylon and acetate light yellow shades. On polyester, it has a light green-yellow fluorescence.

EXAMPLE 16

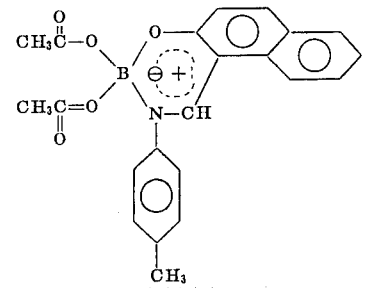

To a solution of 5.22 g. N-(2-hydroxy-1-naphthylidene)-toluidine in 50 ml. acetic acid is added 2.5 g. phenylboric acid. The whole is heated at reflux for 1.25 hours, cooled and the product filtered, washed with 20 ml. ethanol and dried to give 2.0 g., m. 218–20° C.

If boric acid is used instead of phenylboric acid, the same product is obtained. It dyes polyester, nylon and acetate, a light green yellow.

It imparts a light green-yellow to poly(methyl methacrylate) lacquer in 0.125 percent concentration which fluoresces bluish white under UV light. When applied over black, a slightly bluish case is apparent.

EXAMPLE 17

Disperse Dyeing Procedure

A stock dye solution prepared by dissolving 175 mg. dye in 20 to 30 cc. acetone. This is added to a solution prepared by mixing 7 cc. 5 percent sodium lauryl sulfate solution in 100 cc. water at 120° F. The volume is brought to 350° cc. volume with water at 100° to 120° F.

A 50 cc. portion of the above dye stock solution is added to 150 cc. water. In the case of dyeing polyesters, a carrier is used in the dye bath. The amount of carrier used is 3 ml. of a 50 percent methyl salicylate aqueous emulsion.

A 5-gram skein of fibers of the type mentioned below is introduced. The dye bath is heated to the temperature indicated and dyed for 1 hour at that temperature. It is removed and rinsed. Two of the types are scoured after dyeing, polyester and modified polypropylene. Scouring is done for 10 minutes at the boil in 0.2 percent neutral soap solution followed by rinsing. The skeins are dried.

The same procedure may be followed with 5-gram pieces of fabric instead of yarn or skeins. Fibers Dyed

| | |
|---|---|
| polyester (polyethylene terphthalate) | at 212° F. |
| nylon 66 carpet yarn | at 205° F. |
| acetate (cellulose acetate) | at 205° F. |
| polypropylene, modified with an amine or amide | at 212° F. |
| polyacrylonitrile, modified with an amine or amide | at 212° F. |

A 0.5 percent shade of dye on the weight of the yarn or fabric is obtained by this procedure. This is the depth of shade described in the examples unless otherwise noted.

I claim:
1. A 1,3,2-oxazaborinide of the formula

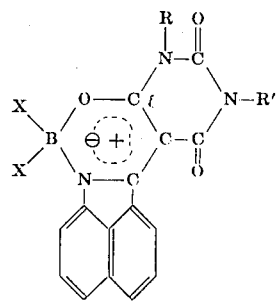

wherein X represents chloro, fluoro or acetoxy and R and R' represent hydrogen, methyl or ethyl.

2. The compound

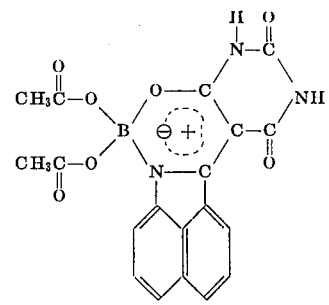

* * * * *